United States Patent
Horn et al.

(10) Patent No.: US 7,069,382 B2
(45) Date of Patent: Jun. 27, 2006

(54) METHOD OF RAID 5 WRITE HOLE PREVENTION

(75) Inventors: Robert L. Horn, Yorba Linda, CA (US); Virgil V. Wilkins, Perris, CA (US)

(73) Assignee: Aristos Logic Corporation, Foothill Ranch, CA (US)

( * ) Notice: Subject to any disclaimer, the term of this patent is extended or adjusted under 35 U.S.C. 154(b) by 286 days.

(21) Appl. No.: 10/743,048

(22) Filed: Dec. 23, 2003

(65) Prior Publication Data

US 2005/0066124 A1    Mar. 24, 2005

Related U.S. Application Data

(60) Provisional application No. 60/505,020, filed on Sep. 24, 2003.

(51) Int. Cl.
*G06F 12/00* (2006.01)

(52) U.S. Cl. .......................... 711/114; 711/162; 714/6; 714/7

(58) Field of Classification Search .............. 711/114, 711/161–162; 714/1–7; 707/200–204
See application file for complete search history.

(56) References Cited

U.S. PATENT DOCUMENTS

| | | | | |
|---|---|---|---|---|
| 5,502,836 A | * | 3/1996 | Hale et al. ................... | 711/170 |
| 5,546,558 A | * | 8/1996 | Jacobson et al. ............ | 711/114 |
| 5,826,001 A | | 10/1998 | Lubbers et al. | |
| 5,933,592 A | | 8/1999 | Lubbers et al. | |
| 5,996,046 A | | 11/1999 | Yagisawa et al. | |
| 6,351,825 B1 | | 2/2002 | Kaneda et al. | |
| 6,766,491 B1 | * | 7/2004 | Busser ........................ | 714/770 |

\* cited by examiner

*Primary Examiner*—Nasser Moazzami
(74) *Attorney, Agent, or Firm*—Dickstein Shapiro Morin & Oshinsky LLP

(57) ABSTRACT

A method of efficiently preventing data loss, specifically a RAID 5 write hole, in data storage system by storing valid parity information at the storage controller level during data write operations. The method employs the use of redundant data structures that hold metadata specific to outstanding writes and parity information. The method uses the redundant data structures to recreate the write commands and data when a system failure occurs before the writes have completed.

8 Claims, 3 Drawing Sheets

METHOD OF RAID 5 WRITE HOLE PREVENTION

CROSS-REFERENCE TO RELATED APPLICATIONS

This application claims priority under 35 USC § 119 to U.S. Provisional Application No. 60/505,020, filed Sep. 24, 2003, the entire contents of which is incorporated herein by reference.

FIELD OF THE INVENTION

The present invention is a method of efficiently preventing data loss in a data storage system. Specifically, the invention discloses a method of protecting against a RAID 5 write hole and subsequently recovering from a failure in a networked storage system.

BACKGROUND OF THE INVENTION

The redundant array of independent disks (RAID) configuration is designed to combine multiple inexpensive disk drives into an array to obtain performance, capacity, and reliability that exceeds that of a single large drive. The array of drives can be made to appear to the host computer as a single logical drive.

There are five types of array architectures, i.e., RAID 1 through RAID 5, each providing disk fault tolerance with different compromises in features and performance. In addition to these five redundant array architectures, it has become popular to refer to a non-redundant array of disk drives as a RAID 0 array.

RAIDs 2–5 employ a technique known as striping that writes a block of data across several hard disk drives. This is a method of combining multiple drives into one logical storage unit. Striping partitions the storage space of each drive into stripes, which can be as small as one sector (typically 512 bytes) or as large as several megabytes. These stripes are then interleaved in a rotating sequence, so that the combined space is composed alternately of stripes from each drive. The specific type of operating environment determines whether large or small stripes are used.

Of the original five RAID types, RAID 5 has become the most popular with networked storage system integrators. It provides an excellent balance between cost and performance while providing redundant data storage. Under RAID 5, parity information is distributed across all the drives. Unlike other striped RAID architectures, RAID 5 has no dedicated parity drive; therefore, all drives contain data, and read operations can be overlapped on every drive in the array. Write operations typically access one data drive and one parity drive. However, because different records store their parity on different drives, write operations can usually be overlapped. The following is a simplified example of how RAID 5 calculates parity and restores data from a failed drive.

Data reconstruction is accomplished by a RAID controller, in conjunction with array management software that examines the sum of each bit position across a slice of all the functional drives in the RAID 5 to assign an even or odd number to the missing data. The missing bit is the exclusive OR (XOR) of the other data bits in the slice including parity. This process is repeated, slice by slice, until the data is rebuilt. If a hard disk drive fails and the host calls for information on that disk, the data is built dynamically from the remaining hard disk drives and placed into memory until a replacement drive is obtained. In this manner, data loss is prevented. Consistent parity is defined as the parity as recorded on the media, and is the XOR of all the data bits as recorded on the media. If the data from one of the members becomes unavailable, that data may be reconstructed if the parity is consistent.

However, if a system fails or if power is lost with multiple writes outstanding to RAID 5 hard disk drives before parity is calculated and recorded, a write hole may occur. A write hole is a state in which parity is no longer consistent and cannot be used to reconstruct the data that was in process of being stored to disk when the failure occurred. One or several writes may have been completed before the failure; however, unless all writes were completed, the parity is inconsistent. Parity is only valid when all of the data is present for its calculation. The additional loss of a drive upon system restoration compounds the problem further by creating a situation in which the data contained on the failed drive is no longer reconstructable due to inconsistent parity. In this case, both the most recent write data and the data stored on the failed device are lost.

An example of a RAID 5 write hole protection scheme is identified in U.S. Pat. No. 5,744,643, entitled, "Enhanced RAID Write Hole Protection and Recovery". The '643 patent describes a method and apparatus for reconstructing data in a computer system employing a modified RAID 5 data protection scheme. The computer system includes a write back cache composed of non-volatile memory for storing writes outstanding to a device and its associated data read and for storing metadata information in the non-volatile memory. The metadata includes a first field containing the logical block number or address (LBN or LBA) of the data, a second field containing the device ID, and a third field containing the block status. From the metadata information, it is determined where the data was intended to be written when the crash occurred. An examination is made to determine whether parity is consistent across the slice; if it is not, the data in the non-volatile write back cache is used to reconstruct the write that was being performed when the crash occurred to ensure consistent parity, so that only those blocks affected by the crash have to be reconstructed.

Because there are many RAID controllers available on the market, there are equally many RAID 5 write hole protection methods available. A RAID controller (or a storage controller) that includes a transaction processor may be used in conjunction with an alternative method for RAID 5 write hole protection. One transaction processor used in networked storage controllers is described in U.S. patent application Ser. No. 10/429,048, entitled "Scalable Transaction Processing Pipeline" and is hereby included by reference. The '048 application describes a parallel processing system that employs data structures and specific hardware to process networked storage commands and effectively manage host access to the storage drives.

SUMMARY OF THE INVENTION

It is therefore an object of the invention to provide a method to prevent a RAID 5 write hole in a networked storage system.

It is another object of this invention to method to prevent a RAID 5 write hole while using a minimum of memory space in a transaction processing networked storage system.

It is yet another object of this invention to a method to fully recover from a system failure without loss of data in a networked storage system.

The present invention achieves the foregoing objective by providing a method of persistently storing new parity information in order to prevent a RAID 5 write hole.

More specifically, the invention provides a method of RAID 5 write hole prevention in which a first data structure is allocated locally in memory of a master controller and a second data structure mirroring the first data structure is allocated in memory of a redundant controller. At least one partial stripe of data from the hard disk drives of the RAID system is read, the partial stripe comprising the data necessary to generate parity for a complete stripe, the parity for the stripe is generated by the master controller, and the first data structure of the master controller is mirrored to the second data structure of the redundant controller. The data and parity are then copied onto corresponding hard disk drives of said RAID, and the first and second data structures are deallocated.

These and other features and advantages of the present invention will become apparent when the following description is read in conjunction with the accompanying drawings.

DETAILED DESCRIPTION OF THE INVENTION

Figure 1:
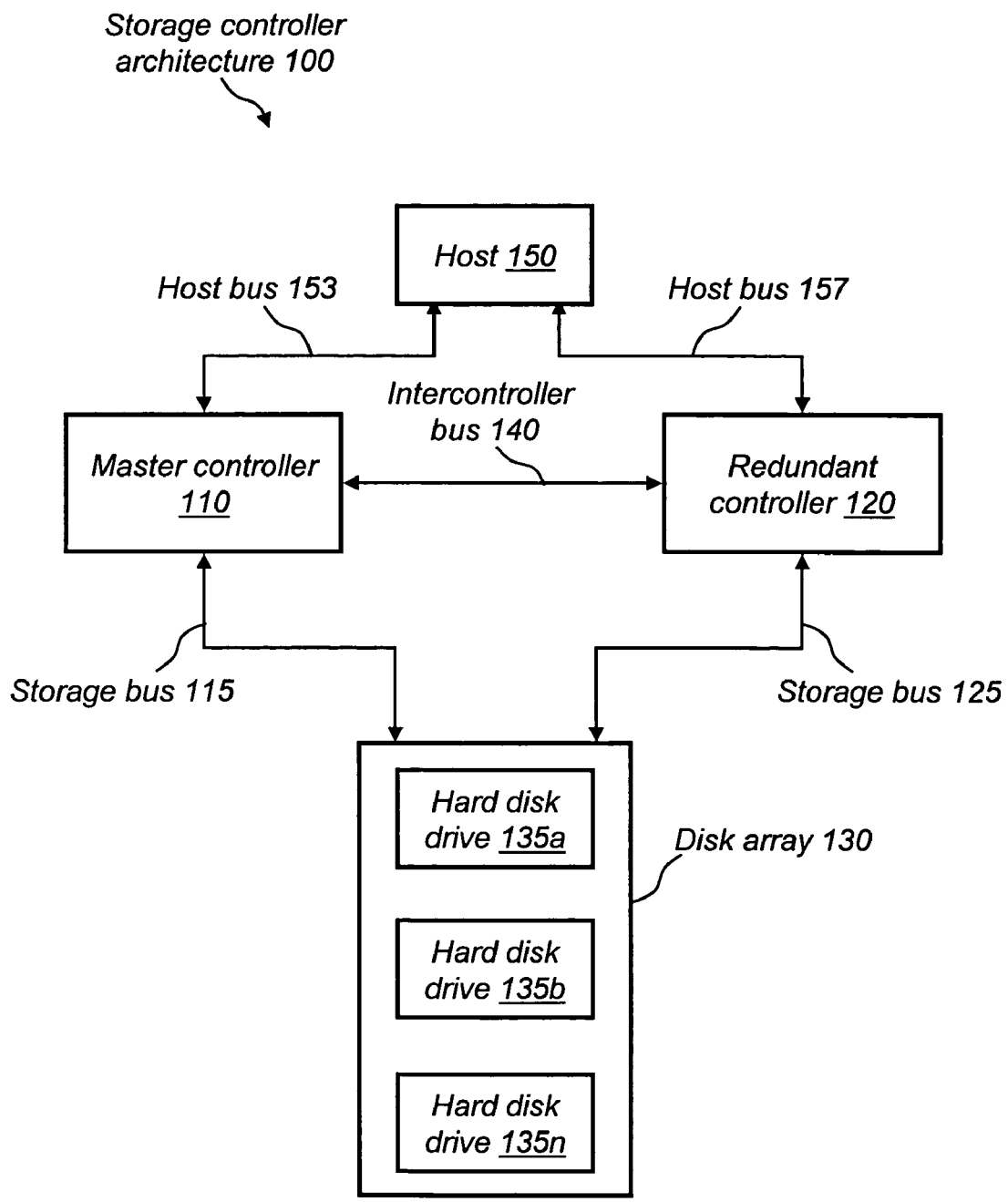
FIG. 1 illustrates a storage controller architecture.

FIG. 1 illustrates a storage controller architecture 100 that includes a master controller 110, a storage bus 115, a redundant controller 120, a storage bus 125, a disk array 130 (RAID), an intercontroller bus 140, a host 150, a host bus 153, and a host bus 157.

Disk array 130 further includes a hard disk drive 135a, a hard disk drive 135b, and a hard disk drive 135n. In general, "n" is used herein to indicate an indefinite plurality, so that the number "n" referring to one component does not necessarily equal the number "n" of a different component Master controller 110 and redundant controller 120 are storage system controllers capable of managing all of the incoming, outgoing, and resident data in the architecture through specialized architectures, algorithms, and hardware. Master controller 110 and redundant controller 120 accept storage access requests from host 150 and execute storage access commands to disk array 130. Further, master controller 110 and redundant controller 120 can communicate to each other via intercontroller bus 140. Intercontroller bus 140 may be any type of data communication bus.

Host 150 is any computational or data processing device that is capable of requesting storage access.

Host bus 153 and host bus 157 may be any type of data communication bus. In alternate configurations, host bus 153 and host bus 157 may be the same connection or may be part of a switched or looped data communication protocol.

Storage bus 115 and storage bus 125 may be any type of data communication bus. In alternate configurations, storage bus 115 and storage bus 125 may be part of a switched or looped communication protocol.

Figure 2:
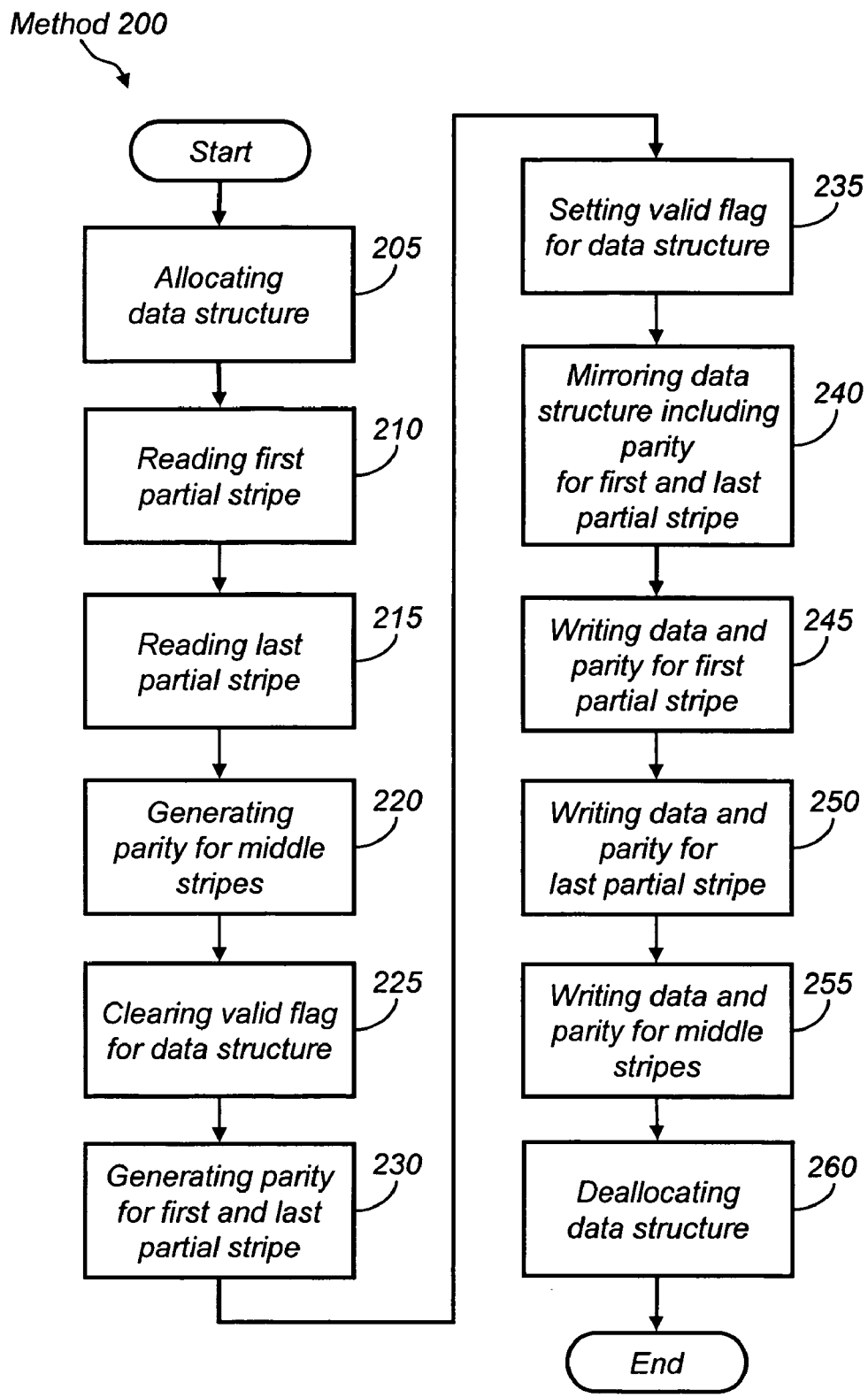
FIG. 2 is a flow diagram of a method of preventing write holes in a RAID 5 architecture.

FIG. 2 is a flow diagram of a RAID 5 write hole prevention method 200. The description of method 200 assumes the use of multiple storage controllers as described in FIG. 1. Method 200 is easily applied to a single controller with cached memory; however, in a stand-alone controller configuration, the system is exposed to data loss if the stand-alone controller fails.

Step 205: Allocating Data Structure

In this step, master controller 110 allocates a data structure both locally and mirrored in redundant controller 120. Master controller 110 sets the invalid flag in its control register to indicate that the new data structures are not valid. Method 200 proceeds to step 210.

Step 210: Reading First Partial Stripe

In this step, master controller 110 reads the data to generate parity for the first stripe on hard disk drives 135 into its memory. As a result, the sectors required to generate the parity for the first stripe are resident in master controller 110 memory. This memory may be volatile, may be non-volatile, or may have a battery backup. Method 200 proceeds to step 215.

Step 215: Reading Last Partial Stripe

In this step, master controller 110 reads the data to generate parity for the last stripe into master controller 110 memory. The memory now includes all the sectors required to generate the parity for the first and last stripe. The memory also includes all the sectors required to generate parity for all middle stripes between the first and last stripe. Method 200 proceeds to step 220.

Step 220: Generating Parity for Middle Stripes

In this step, master controller 110 generates the parity for all middle stripes using the XOR function and stores the parity code in a data structure that is also in memory. Method 200 proceeds to step 225.

Step 225: Clearing Valid Flag for Data Structure

In this step, master controller 110 clears a valid flag in its control register so that, in the event of a system failure, the new data structure is not used to recover and rebuild. In that instance, the post-failure active controller rebuilds the system using the last previously valid parity from the last previously valid data structure. Method 200 proceeds to step 230.

Step 230: Generating Parity for First and Last Partial Stripe

In this step, master controller 110 performs the XOR function to generate parity for the first and last partial stripes. The parity results are also stored in the data structure. Method 200 proceeds to step 235.

Step 235: Setting Valid Flag for Data Structure

In this step, master controller 110 sets the valid flags in its control register and in the control register of redundant controller 120 indicating that, in the event of a system failure, the current data structure is valid. It also stores the valid bit, the volume and RAID group with which the data structure is associated, the Small Computer System Interface (SCSI) command data byte (CDB), the storage element number for the CDB drive write, and the number for the drive receiving that write data. All the information necessary to recover from a system failure, should a drive fail after recovery, is now persistently stored and available to rebuild the data in the drive. Method 200 proceeds to step 240.

Step 240: Mirroring Parity for First and Last Partial Stripe

In this step, master controller 110 mirrors the data structure to redundant controller 120. The data structure includes the parity information, drives, and LBA ranges of those drives that have outstanding write commands. All of the metadata for a system rebuild is stored redundantly in this step. After mirroring the data structure, redundant controller 120 sends a status message to master controller 110 reporting that the data structure has been mirrored successfully. Method 200 proceeds to step 245.

Step 245: Writing Dirty Data and Parity for First Partial Stripe

In this step, master controller 110 initiates the process of recording the data and parity stored in memory onto corresponding hard disk drives 135 included in the first partial stripe. Method 200 proceeds to step 250.

Step 250: Writing Data and Parity for Last Partial Stripe

In this step, master controller 110 writes the data and parity stored in memory to the last partial stripe. Method 200 proceeds to step 255.

Step 255: Writing Data and Parity for Middle Stripes

In this step, master controller 110 writes the remaining data and parity to the corresponding middle stripes on their respective drives. In the event of a master controller 110 and/or a drive failure, all of the data from the middle stripes is available from redundant controller 120 memory. This data is recorded to a drive once the surviving controller and drives are available. No extra overhead is required to determine which of the outstanding writes had completed and which had not. Method 200 proceeds to step 260.

Step 260: Deallocating Data Structure

In this step, master controller 110 deallocates both the locally stored and mirrored data structure memory. Method 200 ends.

Figure 3:
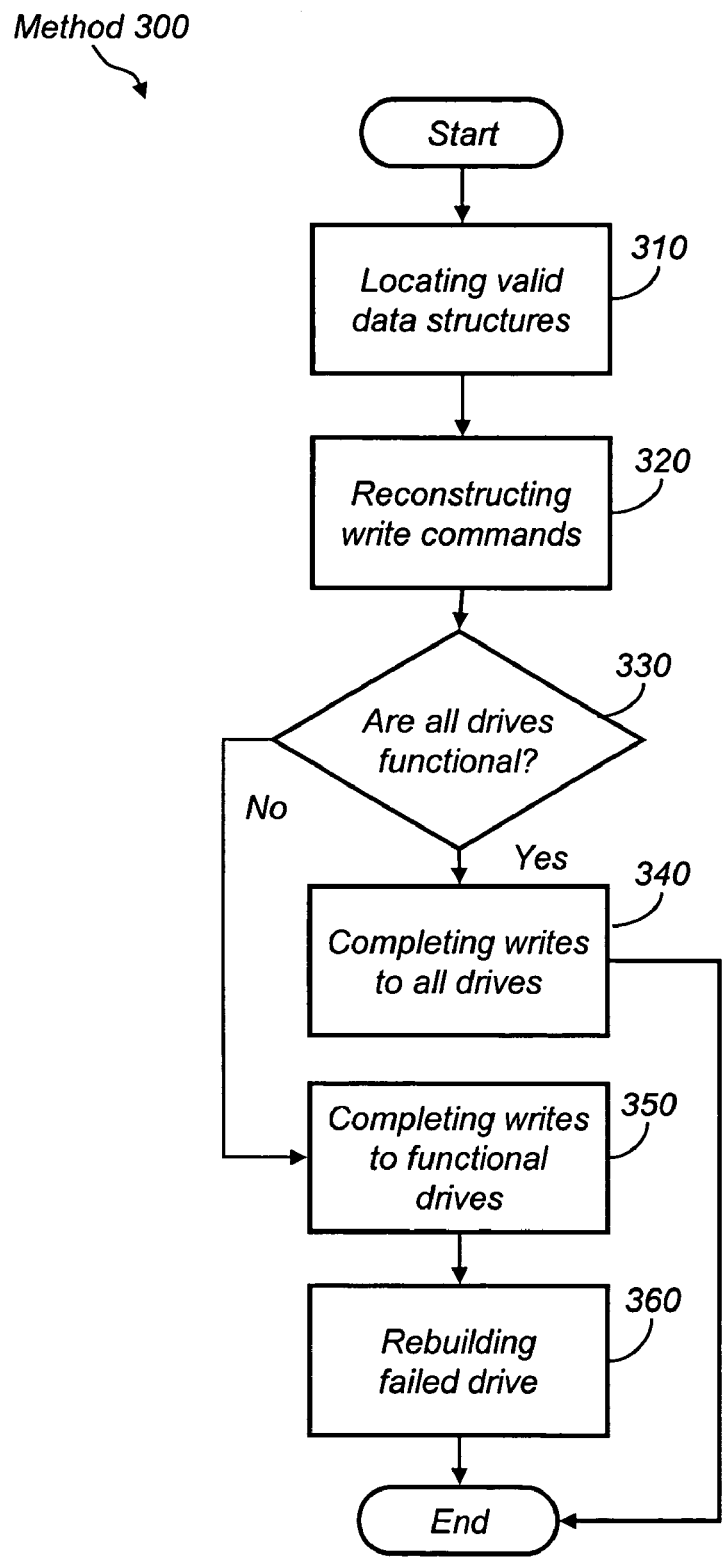
FIG. 3 is a flow diagram of a method of recovering and rebuilding data after a system failure.

FIG. 3 is a flow diagram of a method 300 of recovering and rebuilding data after a system failure.

Step 310: Locating Valid Data Structures

In this step, master controller 110 or redundant controller 120 is notified that a system failure has occurred. If master controller 110 fails to come online after the system failure, redundant controller 120 assumes control of the RAID system. The controller now responsible for controlling the rebuild, referred to as the active controller, locates all the valid data structures by examining the valid bit of the data structures stored in controller memory. Method 300 proceeds to step 320.

Step 320: Reconstructing Write Commands

In this step, the active controller uses the data structure that identifies which dirty cache sectors need to be written, and the location of the stored parity information, in order to reconstruct the write data commands that may or may not have been written completely to storage devices (hard disk drives for the RAID system) prior to system failure. Method 300 proceeds to step 330.

Step 330: Are all Drives Functional?

In this decision step, the active controller determines whether all drives are functional after the system failure. If yes, method 300 proceeds to step 340; if no, method 300 proceeds to step 350.

Step 340: Completing Writes to All Drives

In this step, the active controller completes all the outstanding writes that were interrupted during the system failure to their respective drives. The active controller uses the reconstructed write commands and data to perform this step. Method 300 ends.

Step 350: Completing Writes to Functional Drives

In this step, the active controller completes all the outstanding writes that were interrupted during the system failure to their respective drives, except for those writes outstanding to the non-functional drive(s). Method 300 proceeds to step 360.

Step 360: Rebuilding Failed Drives

In this step, the active controller finds a new drive to replace the failed drive and begins to rebuild the information from the failed drive onto the new drive. The controller uses the parity information and data from other functional drives, to accurately rebuild the failed drive. In this manner, there is no loss of data. Method 300 ends.

While the invention has been described and illustrated with reference to specific exemplary embodiments, it should be understood that many modifications and substitutions can be made without departing from the spirit and scope of the invention. Accordingly, the invention is not to be considered as limited by the foregoing description but is only limited by the scope of the appended claims.

What is claimed as new and desired to be protected by Letters Patent of the United States is:

1. A method of write hole prevention in a redundant array of independent disks (RAID), said method comprising:
    allocating a first data structure locally in memory of said master controller and allocating a second data structure mirroring said first data structure in memory of a redundant controller;
    indicating that said first and second data structures are not valid;
    reading at least one partial stripe of data, said partial stripe comprising the data necessary to generate parity for a complete stripe on hard disk drives of said RAID into the first data structure in said master controller;
    generating the parity for said stripe;
    mirroring the parity for said stripe to the second data structure in the redundant controller;
    indicating that said first and second data structures are valid;
    writing the data and parity onto corresponding hard disk drives of said RAID after said first and second data structures are indicated to be valid; and
    de-allocating said first and second data structures.

2. The method according to claim 1, wherein said step of reading at least one partial stripe of data comprises reading a plurality of partial stripes of data, including:
    reading a first partial stripe of data from said hard disk drives of said RAID into the first data structure in said master controller; and
    reading a last partial stripe of data from said hard disk drives of said RAID into the first data structure in said master controller.

3. The method according to claim 2, wherein the step of generating comprises:
    generating the parity for all middle stripes between said first stripe and said last stripe; and subsequently
    generating the parity for the first stripe and the last stripe.

4. The method according to claim 3, wherein the step of mirroring comprises:
    mirroring the parity for the first and last stripes to the second data structure in the redundant controller.

5. The method according to claim 1, wherein the first data structure is indicated to be valid after the parity for the stripe is generated.

6. The method according to claim 5, wherein the second data structure is indicated to be valid after the step of mirroring the parity for the stripe.

7. The method according to claim 1, further comprising recovering data stored in the RAID after a system failure by the steps of:
    assuming control of the rebuild with an active controller;
    locating, with said active controller, valid data structures;
    identifying, using said valid data structures, which cache sectors need to be recorded to a plurality of hard disk drives of said RAID and locating stored parity information in order to reconstruct any write commands that were not completely executed to said plurality of hard disk drives of said RAID prior to system failure;

determining if all hard disk drives of said RAID are functional;

if all hard disk drives are functional, completing all outstanding write commands that were interrupted during said system failure using said reconstructed write commands and data; and if not all hard disk drives are functional, completing all outstanding write commands that were interrupted during said system failure using said reconstructed write commands and data except those outstanding write commands that are directed to non-functional hard disk drives of said RAID.

8. A storage controller architecture, comprising:

a master controller including a first data structure for storing data and parity information relating to at least one stripe of data in a redundant array of independent disks (RAID); and a redundant controller including a second data structure containing a redundant copy of the data and parity information contained in the first data structure;

wherein the master and the redundant controllers are configured to respectively indicate that the first and second data structures are invalid prior to the master controller receiving the data relating to the at least one stripe of data, and to respectively indicate that the first and second data structures are valid after the parity information relating to the at least one stripe of data has been generated.

* * * * *